United States Patent Office 3,015,598
Patented Jan. 2, 1962

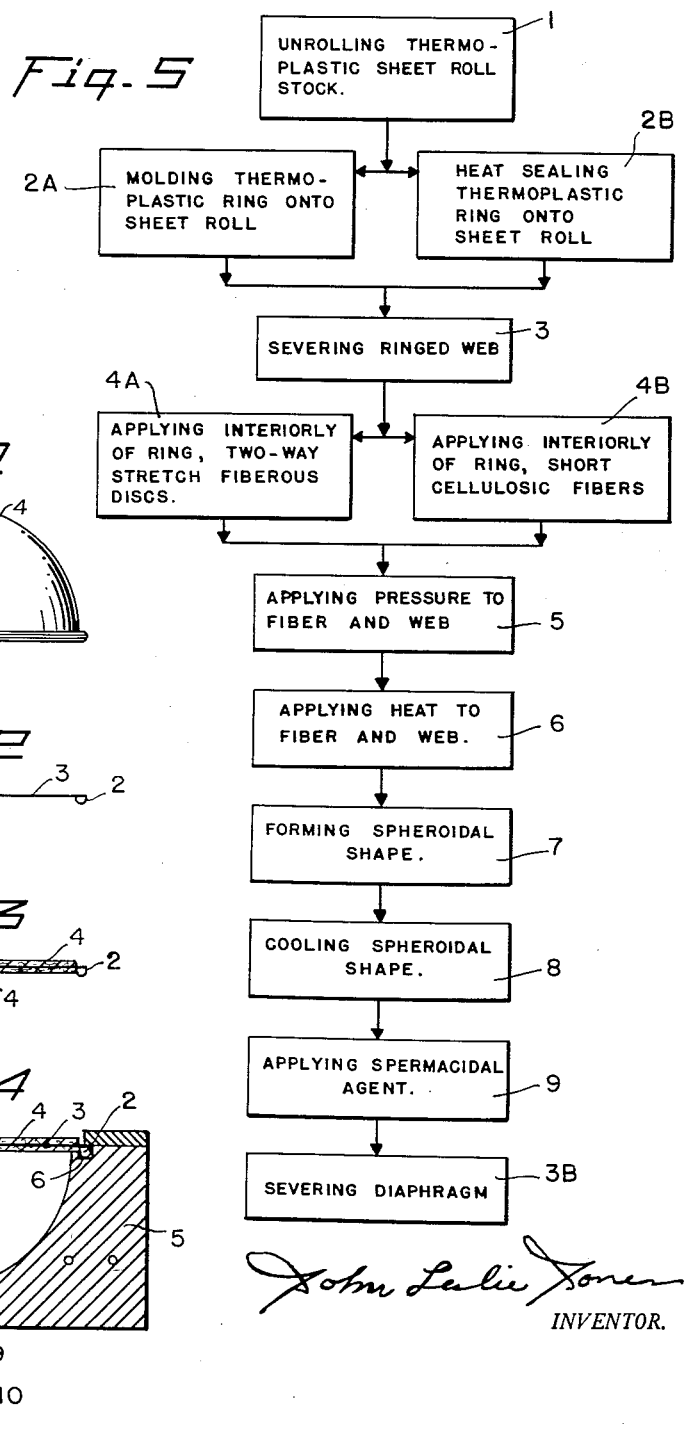

3,015,598
MANUFACTURING ABSORBENT DIAPHRAGMS
John Leslie Jones, 1070 Glen Oaks Blvd., Pasadena, Calif.
Filed Nov. 3, 1958, Ser. No. 771,502
10 Claims. (Cl. 156—222)

This is a continuation-in-part of my U.S. Patent application Serial Number 632,345, filed January 3, 1957.

This is also a continuation-in-part of my U.S. Patent application Serial Number 603,829, filed August 13, 1956.

This invention relates to a new and useful process for manufacturing absorbent diaphragms.

Included in the objects of my invention are:

First, to provide a rapid and inexpensive method of manufacturing my improved absorbent diaphragms.

Second, to provide a cheap, sanitary method of manufacturing my improved, single use, absorbent diaphragms, without hand labor.

Third, to provide a versatile method of manufacture of my improved absorbent diaphragms, including the several of my modifications of absorbent layers.

Further objects and advantages of my invention will become apparent in the following description.

I propose a new and improved method of manufacturing my previously disclosed absorbent diaphragms of my U.S. Patent application Serial Number 632,345. Reference is directed to the accompanying drawings in which:

FIGURE 1 is an enlarged side, perspective view of one of my diaphragms.

FIGURE 2 is a sectional view through a thermoplastic sheet and a reinforcing ring forming a web.

FIGURE 3 is a sectional view through a laminated ply structure.

FIGURE 4 is a sectional, elevational view of a vacuum mold and a laminated ply structure positioned in said mold prior to forming the spheroidal shape.

FIGURE 5 is a schematic flow-sheet diaphragm of my improved method of manufacturing my absorbent diaphragms.

I define the thermoplastic web as comprising the thermoplastic reinforcing ring and the thermoplastic sheet formed into a unit. I define a sandwich structure as one in which the thermoplastic web is loosely combined with one to two layers of two-way stretch fibrous structures on each of one to two surfaces of the thermoplastic sheet. I define the laminated ply structure as one in which thermoplastic sheet of the web has been combined by the application of heat and pressure with one to two layers of two-way stretch fibrous structures, each on one side of the thermoplastic sheet, unit structure.

I may use as the flexible thermoplastic sheet of my diaphragm polyethylene, polypropylene, low plasticized vinyl chloride, plasticized cellulose acetate butyrate or the like. It is a prime requirement of the flexible thermoplastic sheet of my invention that it retain its shape after being formed into the desired spheroidal dimensions and not to have cold flow or not to have elastic memory.

The plastic material of the sheet and reinforcing ring should be chemically and physically compatible.

Reference is first directed to my FIGURE 1 in which is shown one of my improvements in absorbent diaphragms, earlier disclosed in my application of Serial Number 632,345. In my earlier invention I disclose a combination of a spermicidal absorbent layer, permanently affixed to a sperm impervious flexible layer. The spermicidal absorbent layer of the applicants invention consists of two modifications as follows:

(1) Integral spermicidal absorbent layer.
(2) Spermicide impregnated absorbent layer.

Further details of the examples of my two modifications of spermicidal absorbent layers are given in my earlier disclosure of above. The function of the spermicidal absorbent layer is to absorb the sperm injected into the vagina and immobilize the sperm in the absorbent layer. The spermicidal nature of the absorbent layer then becomes effective, killing or immotilizing the sperm. In my FIGURE 1 illustrated, 1 is a flexible, spheroidal shaped absorbent diaphragm comprising a fibrous outer layer 4, and attached thereto is a flexible thermoplastic reinforcing ring 2, whose function is to maintain the roundness of the diaphragm, when it is positioned in the vagina.

FIGURE 2 illustrates a sectional view through a thermoplastic sheet 3, having a flexible thermoplastic ring 2 heat sealed to form the web. Alternatively, the ring 2 may be integrally molded onto the sheet 3.

FIGURE 3, illustrates a further step in my process, wherein a laminated ply structure is formed by heat sealing a pair of fibrous disc blanks to my web of FIGURE 2. In FIGURE 3 the fibrous structure 4 is a pair of fibrous disc blanks having a two-way stretch. Alternatively, the fibrous structure 4 may be made by heat sealing short cellulosic fibers, randomly positioned, onto the sheet 3.

FIGURE 4 illustrates a still further step in my process, wherein the laminated ply structure of FIGURE 3 is positioned in a spheroidally concave mold just prior to vacuum molding into a hemispherical shape diaphragm. In FIGURE 4, the laminated ply structure of FIGURE 3, comprising the ring 2, the sheet 3, and the fibrous structures 4, is unitarily held in a hollow, hemispherically shaped metal mold 5, having a hemispherical shaped opening 11. The ring 2 is secured in a reinforcing ring groove 6, by a hold plate 7. An air opening 8 is available for the controlled evacuation of air from the opening 11, through the threaded fitting 9 and the valve 10.

In reference to my FIGURE 5, which is a schematic flow-sheet diagram of my improvement in manufacturing absorbent diaphragms, the boxes represent the orderly numbered steps of the manufacturing process. Alternate steps are indicated in the figure, at appropriate stages of the process, e.g., 2A and 2B. Thermoplastic sheet roll stock is slit to form a roll of the appropriate width and unrolled at an orderly speed (step 1). In step 2 alternately (for step 2A) a thermoplastic reinforcing ring 2 is molded in situ onto the roll, to form a web consisting of a ring 2 and enclosed thermoplastic sheet disc 3; or (for step 2B) a preformed thermoplastic reinforcing ring is heat sealed to the thermoplastic roll stock, to again form a web, consisting of a ring 2 and enclosed thermoplastic sheet disc 3. At the next step (step 3A) alternatively, the web, consisting of the ring 2 and sheet disc 3, may be severed from the roll; or the web and the attached sheet roll may be processed through the next step 4.

Again in step 4, alternate steps are available. In step 4A, one to two fibrous discs 4, having a two-way stretch are applied interiorly of the ring 2 to one or two faces of the plastic sheet of the web, as in FIGURE 3. In step 4B, as an alternate, short cellulosic type fibers are applied to, and supported contiguously to, the plastic sheet of the web, interiorly of the ring.

In step 5, pressure, of the appropriate amount, is applied to the web and fibrous layers, as by a hydraulic ram.

In step 6, heat is applied to one or both surfaces of the multiple layer of fiber and web, simultaneously with the pressure. The effect of the simultaneous heat and pressure is to laminate the thermoplastic sheet and fibers to form a laminated ply structure. While the laminated ply structure is still hot (as in FIGURE 4), and the reinforcing ring 2 is held in a retaining groove 6 in a mold 5, (step 7) by a hold plate 7 or other similar device, a controlled vacuum is slowly created in the spheroidal opening 11 by removal of air through the hole 8, fitting 9, and valve 10, to allow the external atmosphere to push the laminated ply structure into the mold 5, cooled by cooling coils 10. The formed spheroidal shaped laminated structure is allowed to cool in the spheroidal shaped opening 11 (in step 8). Next, the shaped absorbent diaphragm is severed from the sheet roll (step 3B) in the event the severing was not done as step 3A.

Finally, as discussed earlier, I may use my integral spermicidal absorbent layer or my spermacide impregnated absorbent layer in the process. If I use my integral spermicidal absorbent layer, no further processing of the diaphragm is necessary. If I use my spermicide impregnated absorbent layer, it now becomes necessary (step 9) to add the spermicide to the absorbent layer, as by spraying onto the absorbent layer a diluted solvent solution of the spermicide and drying off the solvent.

In my step 2A the molding may be done by injection or transfer molding, in any case, by a process in which heated, fluidized thermoplastic is injected into a mold in which the thermoplastic sheet is adjacent to a ring groove mold. The hot plastic fuzes the sheet sufficiently to form a weld, adhering the ring, molded in situ, to the sheet. Typically the sheet stock may be 0.010 inch thick, prior to shaping to a hemisphere.

In my step 2B, the heat sealing may be done by ordinary thermal conduction, impulse heating, or by dielectric heating, dependent upon the thermoplastic used.

In my step 4A, an excellent absorbent cellulosic two-way stretch disc may be made from a felted, non-woven fabric illustrated in U.S. Patents 2,528,793 and 2,625,733. Other two-way stretch absorbent materials may be used, such as a nylon fabric knitted with a coiled nylon filament fiber, yielding a knit cloth with a two-way stretch. Ordinary knit cotton jersey and the like have only a substantial one-way stretch and are not satisfactory. A thin pad of absorbent type cotton of course has a two-way stretch. I may use a thin disc of a pad of fibrous oxidized cellulose, as disclosed in my applications, U.S. Serial Numbers 632,345 and 603,829, as an integral spermicidal absorbent layer.

In my step 4B I may use fibers of cellulose methylene carboxylic acid and cellulose ethylene carboxylic acid as disclosed in my applications, U.S. Serial Numbers 603,829 and 632,345, as an integral spermicidal absorbent layer. Also cellulose short fibers, known as chemical cut cotton may be used and impregnated with a spermicide, as disclosed in my application U.S. Serial Number 632,345.

In step 5, pressure may be applied to the sandwich construction of steps 4A and 4B by a hydraulic ram, after the sandwich assembly. Also in the step 5, I may apply pressure by a pneumatic bag applied to the sandwich structure.

The heating of step 6 is easily accomplished by electrical thermal conduction or by infra-red radiation.

The forming of the desired spheroidal shape may be accomplished by the vacuum molding process, discussed in relation to FIGURE 4. Or, alternatively, I may use a hemispheroidal convex shaped metal ram, hydraulic or pneumatic operated, in conjunction with a hemispheroidal concave shaped mold, to shape the heated laminated ply structure of fiber and web. The members of the mold system are cooled to chill the shaped laminated ply structure.

Step 9, applying the spermicidal agent, can be accomplished for those diaphragms which do not include an integral spermicidal absorbent layer, by spraying onto the fibrous absorbent layer the spermicide dissolved in a solvent, and drying out the solvent. A predetermined amount of spermicide can be uniformly applied in this manner.

Obviously, I may arrange some of the steps outlined in FIGURE 5 in a different order, without departing from the letter and spirit of my invention. As an example I may perform step 4A or step 4B, combined with step 5 and step 6 successively, before performing step 2A or step 2B. In addition, it may be desirable to perform step 4A or step 4B, combined with step 5, step 6, step 7 and step 8 successively, prior to performing step 2A or step 2B.

Obviously many modifications and variations of my improvements in manufacturing absorbent diaphragms are possible in the light of the above teachings. It is therefore understood that within the scope of the appended claims, the invention may be practiced otherwise than as specifically described.

I claim:

1. In a process for manufacturing a single use, absorbent diaphragm, the steps comprising: forming a thermoplastic reinforcing ring and a thermoplastic sheet into a thermoplastic web; laminating interiorly of said ring cellulosic fibers to two surfaces of said thermoplastic web, said cellulosic fibers being in a movable spaced relationship, to form a laminated ply structure; and forming said laminated ply structure into a stretched spheroidal shaped diaphragm.

2. In a process for manufacturing a single use, absorbent diaphragm, the steps comprising: forming a thermoplastic reinforcing ring and a thermoplastic sheet into a thermoplastic web; laminating interiorly of said ring two two-way stretch fibrous discs to two surfaces of said thermoplastic web, to form a laminated ply structure; and forming said laminated ply structure into a stretched spheroidal shaped diaphragm.

3. In a process for manufacturing a single use, absorbent diaphragm, the steps comprising: forming a thermoplastic reinforcing ring and a thermoplastic sheet into a thermoplastic web; laminating interiorly of said ring short cellulosic fibers to two surfaces of said thermoplastic web, to form a laminated ply structure; and forming said laminated ply structure into a stretched spheroidal shaped diaphragm.

4. In a process for manufacturing a single use, absorbent diaphragm, the steps comprising: forming a thermoplastic reinforcing ring and a thermoplastic sheet into a thermoplastic web; laminating interiorly of said ring one surface each of a pair of two-way stretch fibrous discs to each of a side of said thermoplastic web, to form a laminated ply structure; and forming said laminated ply structure into a stretched spheroidal shaped diaphragm.

5. In a process for manufacturing a single use, absorbent diaphragm, the steps comprising: forming a thermoplastic reinforcing ring and a thermoplastic sheet into a thermoplastic web; laminating interiorly of said ring one surface each of a pair of two-way stretch fibrous discs to each of a side of said thermoplastic web, to form a laminated ply structure; and stretching said laminated ply structure into a permanent spheroidal shaped diaphragm.

6. In a process for manufacturing a single use, absorbent diaphragm, the steps comprising: forming a thermoplastic reinforcing ring and a thermoplastic sheet into a thermoplastic web; laminating interiorly of said ring one surface each of a pair of fibrous discs to each of a side of said thermoplastic web, to form a laminated ply structure, said pair of fibrous discs having a two-way stretch; heating said laminated ply structure; blowing said heated laminated ply structure into a spheroidal shape; and cooling said laminated ply structure spheroidal shaped diaphragm.

7. In a process for manufacturing a single use, absorbent diaphragm, the steps comprising: forming a thermoplastic reinforcing ring and a thermoplastic sheet into a thermoplastic web; applying interiorly of said ring one surface each of a pair of fibrous discs to each of a side of said thermoplastic web to form a sandwich structure, said fibrous discs having a two-way stretch; applying pressure to said sandwich structure; applying heat to said pressurized sandwich structure, to adhere said sandwich structure into a heated laminated ply structure; blowing said heated laminated ply structure into a spheroidal shape; cooling said laminated ply structure spheroidal shape; and severing said diaphragm exteriorly of said reinforcing ring from said sheet.

8. In a process for manufacturing a single use, absorbent diaphragm, the steps comprising: integrally molding a thermoplastic reinforcing ring onto a thermoplastic sheet to form a thermoplastic web; applying interiorly of said ring one surface each of a pair of fibrous discs to each of a side of said thermoplastic web, to form a sandwich structure, said fibrous discs having a two-way stretch; applying pressure to said sandwich structure; applying heat to said pressurized sandwich structure, to adhere said sandwich structure into a heated laminated ply structure; blowing said heated laminated structure into a spheroidal shape; cooling said laminated ply structure spheroidal shape; and severing said diaphragm exteriorly of said reinforcing ring from said sheet.

9. In a process for manufacturing a single use, absorbent diaphragm, the steps comprising: heat sealing a thermoplastic reinforcing ring and a thermoplastic sheet into a thermoplastic web; applying interiorly of said ring one surface each of a pair of fibrous discs to each of a single side of said thermoplastic web to form a sandwich structure, said fibrous discs having a two-way stretch; applying pressure to said sandwich structure; applying heat to said pressurized sandwich structure, to adhere said sandwich structure into a laminated ply structure; blowing said heated laminated structure into a spheroidal shape; cooling said laminated ply structure spheroidal shape; and severing said diaphragm exteriorly of said reinforcing ring from said sheet.

10. In a process for manufacturing a single use, absorbent diaphragm, the steps comprising: forming a thermoplastic reinforcing ring and a thermoplastic sheet into a thermoplastic web; applying interiorly of said ring a single surface of a two-way stretch fibrous disc each to one to two surfaces of the thermoplastic web, to form a multiple layer structure; applying pressure to said multiple layer structure; applying heat to said pressurized multiple layer structure, to adhere said multiple layer structure into a laminated ply structure; blowing said heated laminated ply structure into a spheroidal shape; cooling said laminated ply structure in a spheroidal shape; and severing said diaphragm exteriorly of said reinforcing ring from said web.

References Cited in the file of this patent

UNITED STATES PATENTS

| | | |
|---|---|---|
| 2,141,040 | Holt | Dec. 20, 1938 |
| 2,354,916 | Hurt | Aug. 1, 1944 |
| 2,423,076 | Daly | July 1, 1947 |
| 2,590,221 | Stevens | Mar. 25, 1952 |
| 2,697,057 | Senger et al. | Dec. 14, 1954 |
| 2,844,354 | Warnken | July 22, 1958 |
| 2,873,227 | Olson et al. | Mar. 10, 1959 |